United States Patent
Geshwind

[11] Patent Number: 5,986,707
[45] Date of Patent: Nov. 16, 1999

[54] METHODS AND DEVICES FOR THE CREATION OF IMAGES EMPLOYING VARIABLE-GEOMETRY PIXELS

[76] Inventor: David Michael Geshwind, 111 Fourth Ave., New York, N.Y. 10003

[21] Appl. No.: 08/483,210

[22] Filed: Jun. 7, 1995

[51] Int. Cl.$^6$ .................................................. H04N 7/26
[52] U.S. Cl. ......................... 348/384; 348/469; 348/716; 348/578
[58] Field of Search ................................ 348/384, 390, 348/571, 578, 580, 214, 716, 469, 470, 441, 458, 910, 173; 345/122; 382/232, 260, 293

[56] References Cited

U.S. PATENT DOCUMENTS

| | | |
|---|---|---|
| 2,940,005 | 6/1960 | Toulon ...................................... 348/384 |
| 4,587,556 | 5/1986 | Collins ...................................... 348/443 |
| 4,621,287 | 11/1986 | Reitmeier et al. ....................... 348/384 |
| 4,677,430 | 6/1987 | Falkman et al. ......................... 348/173 |
| 4,701,793 | 10/1987 | den Hollander et al. ............... 348/910 |
| 4,722,005 | 1/1988 | Ledenbach .............................. 348/173 |
| 4,963,965 | 10/1990 | Haghiri et al. .......................... 348/910 |
| 5,208,875 | 5/1993 | Virtue et al. ............................. 348/578 |
| 5,227,863 | 7/1993 | Bilbrey et al. .......................... 348/578 |
| 5,239,624 | 8/1993 | Cook et al. ............................. 345/122 |

*Primary Examiner*—Victor R. Kostak

[57] ABSTRACT

Processes, devices and systems for creating, manipulating and displaying images employing variable-geometry pixels. Pixels may vary in size, shape or position. Storage and transmission requirements may thus be reduced; as well as an increase in apparent resolution.

40 Claims, 14 Drawing Sheets

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 2

SOURCE

| A 11 | B 11 | A 12 | B 12 | A 13 | B 13 |
|------|------|------|------|------|------|
| D 11 | C 11 | D 12 | C 12 | D 13 | C 13 |
| A 21 | B 21 | A 22 | B 22 | A 23 | B 23 |
| D 21 | C 21 | D 22 | C 22 | D 23 | C 23 |
| A 31 | B 31 | A 32 | B 32 | A 33 | B 33 |
| D 31 | C 31 | D 32 | C 32 | D 33 | C 33 |

DESTINATION

| X 11 | X 11 | X 12 | X 12 | X 13 | X 13 |
|------|------|------|------|------|------|
| X 11 | X 11 | X 12 | X 12 | X 13 | X 13 |
| X 21 | X 21 | X 22 | X 22 | X 23 | X 23 |
| X 21 | X 21 | X 22 | X 22 | X 23 | X 23 |
| X 31 | X 31 | X 32 | X 32 | X 33 | X 33 |
| X 31 | X 31 | X 32 | X 32 | X 33 | X 33 |

FIGURE 3

SOURCE

| A* 11 | B 11 | A* 12 | B 12 | A* 13 | B 13 |
|---|---|---|---|---|---|
| D 11 | C 11 | D 12 | C 12 | D 13 | C 13 |
| A* 21 | B 21 | A* 22 | B 22 | A* 23 | B 23 |
| D 21 | C 21 | D 22 | C 22 | D 23 | C 23 |
| A* 31 | B 31 | A* 32 | B 32 | A* 33 | B 33 |
| D 31 | C 31 | D 32 | C 32 | D 33 | C 33 |

DESTINATION

| A 11 | A 11 | A 12 | A 12 | A 13 | A 13 |
|---|---|---|---|---|---|
| A 11 | A 11 | A 12 | A 12 | A 13 | A 13 |
| A 21 | A 21 | A 22 | A 22 | A 23 | A 23 |
| A 21 | A 21 | A 22 | A 22 | A 23 | A 23 |
| A 31 | A 31 | A 32 | A 32 | A 33 | A 33 |
| A 31 | A 31 | A 32 | A 32 | A 33 | A 33 |

FIGURE 4A

SOURCE

| A 11 | B* 11 | A 12 | B* 12 | A 13 | B* 13 |
|---|---|---|---|---|---|
| D 11 | C 11 | D 12 | C 12 | D 13 | C 13 |
| A 21 | B* 21 | A 22 | B* 22 | A 23 | B* 23 |
| D 21 | C 21 | D 22 | C 22 | D 23 | C 23 |
| A 31 | B* 31 | A 32 | B* 32 | A 33 | B* 33 |
| D 31 | C 31 | D 32 | C 32 | D 33 | C 33 |

DESTINATION

| B 11 | B 11 | B 12 | B 12 | B 13 | B 13 |
|---|---|---|---|---|---|
| B 11 | B 11 | B 12 | B 12 | B 13 | B 13 |
| B 21 | B 21 | B 22 | B 22 | B 23 | B 23 |
| B 21 | B 21 | B 22 | B 22 | B 23 | B 23 |
| B 31 | B 31 | B 32 | B 32 | B 33 | B 33 |
| B 31 | B 31 | B 32 | B 32 | B 33 | B 33 |

FIGURE 4B

SOURCE

| A 11 | B 11 | A 12 | B 12 | A 13 | B 13 |
|---|---|---|---|---|---|
| D 11 | C* 11 | D 12 | C* 12 | D 13 | C* 13 |
| A 21 | B 21 | A 22 | B 22 | A 23 | B 23 |
| D 21 | C* 21 | D 22 | C* 22 | D 23 | C* 23 |
| A 31 | B 31 | A 32 | B 32 | A 33 | B 33 |
| D 31 | C* 31 | D 32 | C* 32 | D 33 | C* 33 |

DESTINATION

| C 11 | C 11 | C 12 | C 12 | C 13 | C 13 |
|---|---|---|---|---|---|
| C 11 | C 11 | C 12 | C 12 | C 13 | C 13 |
| C 21 | C 21 | C 22 | C 22 | C 23 | C 23 |
| C 21 | C 21 | C 22 | C 22 | C 23 | C 23 |
| C 31 | C 31 | C 32 | C 32 | C 33 | C 33 |
| C 31 | C 31 | C 32 | C 32 | C 33 | C 33 |

FIGURE 4C

SOURCE

| A 11 | B 11 | A 12 | B 12 | A 13 | B 13 |
|---|---|---|---|---|---|
| D* 11 | C 11 | D* 12 | C 12 | D* 13 | C 13 |
| A 21 | B 21 | A 22 | B 22 | A 23 | B 23 |
| D* 21 | C 21 | D* 22 | C 22 | D* 23 | C 23 |
| A 31 | B 31 | A 32 | B 32 | A 33 | B 33 |
| D* 31 | C 31 | D* 32 | C 32 | D* 33 | C 33 |

DESTINATION

| D 11 | D 11 | D 12 | D 12 | D 13 | D 13 |
|---|---|---|---|---|---|
| D 11 | D 11 | D 12 | D 12 | D 13 | D 13 |
| D 21 | D 21 | D 22 | D 22 | D 23 | D 23 |
| D 21 | D 21 | D 22 | D 22 | D 23 | D 23 |
| D 31 | D 31 | D 32 | D 32 | D 33 | D 33 |
| D 31 | D 31 | D 32 | D 32 | D 33 | D 33 |

FIGURE 4D (70)

| r7 | r6 | r5 | r4 | r3 | r2 | r1 | r0 |

(71)

| g7 | g6 | g5 | g4 | g3 | g2 | g1 | g0 |

(72)

| b7 | b6 | b5 | b4 | b3 | b2 | b1 | b0 |

(73)

| pm1 | pm0 |

FIGURE 7

| 10 |    | 00 | 01 | 10 |    | 00 | 01 |
|----|----|----|----|----|----|----|----|
| 00 | 11 |    |    | 00 | 11 |    |    |
| 01 |    |    | 00 | 01 |    |    | 00 |
|    | 00 | 10 |    |    | 00 | 10 |    |
| 10 |    | 00 | 01 | 10 |    | 00 | 01 |
| 00 | 11 |    |    | 00 | 11 |    |    |
| 01 |    |    | 00 | 01 |    |    | 00 |
|    | 00 | 10 |    |    | 00 | 10 |    |

| 01 | 10 |    | 00 | 00 | 10 |    | 01 |
|----|----|----|----|----|----|----|----|
|    | 00 | 01 | 11 |    | 01 | 00 |    |
| 10 |    |    |    |    |    | 10 |    |
| 00 | 11 |    | 00 | 00 | 11 |    | 00 |
| 00 |    |    | 00 | 00 |    |    | 00 |
| 10 |    | 01 | 11 |    | 01 | 10 |    |
| 01 | 00 |    |    |    |    | 00 | 01 |
|    | 10 |    | 00 | 00 | 10 |    |    |

| | | | | | | | | | |
|---|---|---|---|---|---|---|---|---|---|
| | A | 1 | 1 | 1 | 1 | 1 | 1 | 1 | 1 |
| TIME 1 | B | | | | 1 | | | | 1 |
| | C | | | | | | | | |

| | | | | | | | | | | |
|---|---|---|---|---|---|---|---|---|---|---|
| | A | 1 | 1 | 1 | 1 | 1 | 1 | 1 | 1 | DISPLAY THIS LINE |
| TIME 2 | B | 2 | 2 | 2 | 1 | 2 | 2 | 2 | 1 | |
| | C | | 2 | 2 | | | 2 | 2 | | |

| | | | | | | | | | | |
|---|---|---|---|---|---|---|---|---|---|---|
| | A | 3 | | | | 3 | | | | |
| TIME 3 | B | 2 | 2 | 2 | 1 | 2 | 2 | 2 | 1 | DISPLAY THIS LINE |
| | C | 3 | 2 | 2 | 3 | 3 | 2 | 2 | 3 | |

| | | | | | | | | | | |
|---|---|---|---|---|---|---|---|---|---|---|
| | A | 3 | 4 | 4 | 4 | 3 | 4 | 4 | 4 | |
| TIME 4 | B | | | | | | | | | |
| | C | 3 | 2 | 2 | 3 | 3 | 2 | 2 | 3 | DISPLAY THIS LINE |

FIGURE 10

METHODS AND DEVICES FOR THE CREATION OF IMAGES EMPLOYING VARIABLE-GEOMETRY PIXELS

CROSS-REFERENCES TO RELATED APPLICATIONS

The instant application is a continuation-in-part of applicant's prior application METHODS AND DEVICES FOR TIME-VARYING SELECTION AND ARRANGEMENT OF DATA POINTS WITH PARTICULAR APPLICATION TO THE CREATION OF NTSC-COMPATIBLE HDTV SIGNALS Ser. No. 08/485,383 filed Jun. 7, 1995.

That prior application is a continuation-in-part of applicant's application Ser. No. 07/077,916 filed Jul. 27, 1987.

That prior application is also a continuation-in-part of applicant's application Ser. No. 08/110,230 filed Aug. 23, 1993 which is a continuation-in-part of Ser. No. 07/435,487 (filed Aug. 17, 1989, now abandoned), which was both: a continuation-in-part of application Ser. No. 07/227,403 filed Dec. 17, 1986 (issued May 15, 1990 as U.S. Pat. No. 4,925,294); and, a continuation-in-part of application Ser. No. 07/006,291 filed Jan. 20, 1987 (issued Sep. 24, 1991 as U.S. Pat. No. 5,050,894) which was a continuation of Ser. No. 06/601,091 (filed Apr. 20, 1984, now abandoned) which was a continuation-in-part of application Ser. No. 06/492,816 filed May 9, 1983 (issued Aug. 19, 1986 as U.S. Pat. No. 4,606,625).

That prior application is also a continuation-in-part of applicant's application 07/951,267 filed September 25, 1992 which is a continuation-in-part of the above referenced application 07/435,487 and also of the above referenced application 07/077,916.

All of these documents (except for those abandoned) are hereby incorporated by reference.

SUMMARY OF INVENTION

The instant invention relates to a class of methods for selecting subsets of information, such as that derived by digitizing a high-definition television signal, and arranging that reduced amount of information into a second set of information which can then be, for example, converted to a low-definition signal which can then be transmitted over channels intended for low-definition signals, with minimal perceivable artifacts; as well as the creation of images employing variable-geometry pixels which was developed to affect the foregoing, but which can also be independently practiced to great advantage.

BRIEF DESCRIPTION OF DRAWINGS

FIG. 2 depicts selection of a subset of a relatively high-resolution television signal for transmission over a lower bandwidth channel, where the upper left corner element (A) of each two-by-two pixel cell, is transmitted (*) for every cell, in every frame of the source image.

FIG. 3 depicts selection of a subset of a relatively high-resolution television signal for transmission over a lower bandwidth channel, where all four picture elements from each two-by-two cell in the source image are averaged, as by a low-pass digital filter, to derive the pixels of the destination display cell denoted by X, in every frame of the source image.

FIGS. 4A through 4D each depict a point sampling scheme, similar to FIG. 2; but, for each figure, a different pixel from the two-by-two cell is sampled, indicated by a (*). These four types of sampling would be alternated in a cycle of four.

FIG. 7 depicts an example of a data structure stored for each pixel of an input or output memory buffer. For each pixel, 8 bits of data are stored representing any of 256 levels of intensity for each of red, green and blue, and two bits representing pixel modification information.

FIG. 10 depicts memory use with a three line recirculating window frame store memory.

FIELD OF INVENTION

Figure 1:
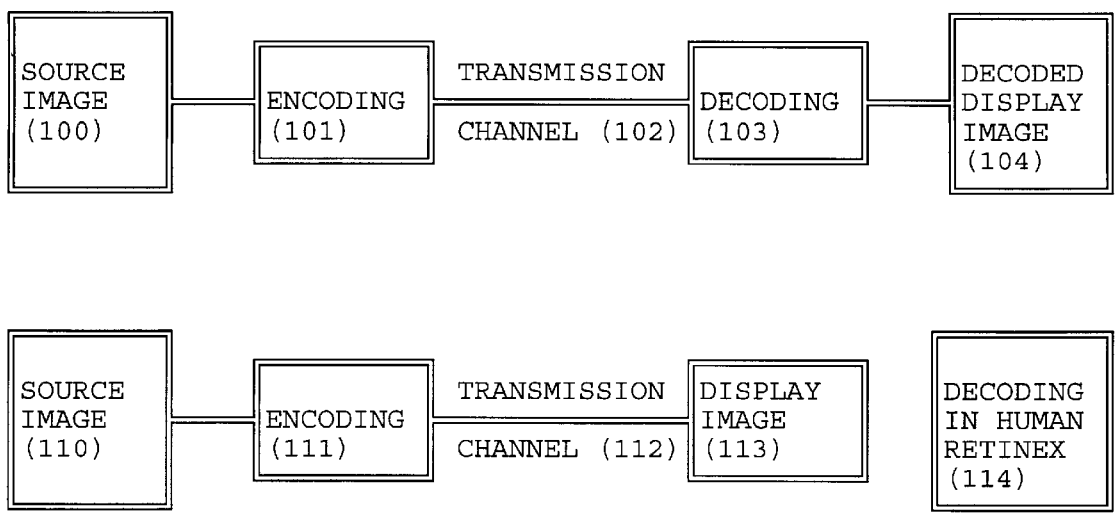
FIG. 1 depicts in the top configuration a standard encoding/decoding bandwidth reduction scheme. The bottom configuration depicts one class of embodiments where decoding occurs after display, as viewed, in the human eye/brain (retinex).

Generally, the domain where the instant invention can be applied is any process, system, device, or product made by a process, which involves a processing element whereby a first information bearing signal (often, a three-dimensional data construct consisting of a two-dimensional image plane and a third dimension of time—e.g., a television or motion picture image stream) is transformed into a second information bearing signal of similar type. Further, these signals, though of similar type, are, generally, different in some characteristic, such as resolution or definition. Examples of such areas of potential application include, without limitation, devices or processes that: encode a higher-definition television or video signal into a lower-definition television or video signal suitable for transmission, display or recording; record, transmit, decode or display such an encoded signal; transduce or transfer an image stream from an imaging element to a transmission or storage element, such as a television camera or film chain; transfer an image stream from a signal input to a recording medium, such as a videotape or videodisc recorder; transfer an image stream from a recording medium to a display element, such as a videotape or videodisc player; transfer data representing images from a computer memory element to a display element, such as a framestore or frame buffer; synthesize an image output stream from a mathematical model, such as a computer graphic rendering component; modify or combine image streams, such as image processing components, time-base correctors, signal processing components, or special effects components; products that result from the foregoing; and many other devices, processes and products that fall within the realm of motion picture and television engineering.

The invention, rather than comprising any of the foregoing, constitutes a method (e.g., a process or algorithm) for selecting and arranging information derived from the first information bearing signal, which processed information will then be used to create a second information bearing signal. Thus, the inventive matter comprses algorithms for selecting and arranging information; as well as otherwise standard devices or processes that incorporate those algorithms, and specially modified or constructed devices and processes that incorporate those algorithms. In particular, the creation of images employing variable-geometry pixels was developed by Inventor to affect the foregoing, but this can also be independently practiced to great advantage.

In particular, the parent method comprises a class of techniques for doing so in a time-varying manner such that the artifacts introduced by the process or device involved become less noticeable to a human viewer than if standard techniques or algorithms are applied. It is this "greater than standard" variability over time, of the selection of information derived from the source signal and/or its arrangement into the information which will comprise the destination signal, that results in the improvement; and, in order to achieve an improvement, the variation over time must be of sufficient magnitude.

To distinguish patterns, techniques, processes or algorithms with variability sufficient to achieve a reduction in perceptual artifacts, from those which do not reduce (and may even increase) such artifacts, the words complex or complexly will be occasionally used herein to modify terms such as sampling pattern, time variation or time-varying STS (Spatial Temporal Signature, described below); and the words complex or complexity (sometimes used with variation) will be occasionally used to point out inventive techniques which can be used to achieve a sufficient magnitude of variation for effective practice.

Examples of "complex variable STS" or "complexity" when used to describe a variable STS or sampling pattern herein comprise, singly or in combination: rectangular (M×N) multi-pixel cells with a sampling scheme that decimates information significantly less than by a factor of M×N for a particular frame; multi-pixel cells that are non-rectangular; multi-pixel cells where more than a single pixel is sampled for a particular frame; pseudo-random and/or non-contiguous multi-pixel cells; distributions of multi-pixel cells of non-uniform size or shape over an image, or from frame to frame; multiplication weights for information points not equal to 1 (or a constant), or which change over a cell or frame, or from frame to frame; sampling schemes that utilize non-uniform time slices from frame to frame or over a frame; or as otherwise described herein. Thus, the word "complex", unless otherwise indicated, as used herein means intricate or sophisticated, and does not refer to numbers comprising real and imaginary parts.

BACKGROUND ART

The intended practitioner of the present invention is someone who is skilled in designing, implementing, integrating, building, creating, programming or utilizing processes, devices, systems and products, such as described in the first paragraph of this disclosure. That is, one skilled in the art required to practice the instant invention is capable of one or more of the following: design and/or construction of devices, systems, hardware and software (i.e., programming) for motion picture and television production, motion picture and television post production, signal processing, image processing, computer graphics, and the like. That is, motion picture and television engineers, computer graphic system designers and programmers, image processing system designers and programmers, digital software and hardware engineers, communication and information processing engineers, applied mathematicians, etc.

Those skilled in the art know how to accomplish such tasks as to: design and construct devices, design and integrate systems, design software for and program those devices and systems, and utilize those devices and systems to create information product, which devices and systems transfer and/or transform information derived from image streams. Such devices and systems comprise well known digital or analog electronic hardware, and software, components. The details of accomplishing such standard tasks are well known and within the ken of those skilled in these arts; are not (in and of themselves) within the scope of the instant invention; and, will be referred to but not described in detail in the instant disclosure.[1]

[1]. Typical examples include:
Digital Video: Selections from the SMPTE Journal and Other Publications, Society of Motion Picture and Television Engineers, Inc. (SMPTE), 1977.
Digital Video Volume 2, SMPTE 1979.
Digital Video Volume 3, SMPTE 1980.
Graphics Engines, Margery Conner, Electronic Design News (EDN), Cahners Publishing Company, Newton, Mass., Volume 32, Number 5, March 4, 1987, pages 112–122.
Algorithms for Graphics and Image Processing, Theo Pavlidis, Computer Science Press 1982.
Computer Vision, Ballard and Brown, Prentice-Hall, Englewood Cliffs 1982.
Industrial Applications of Machine Vision, IEEE Computer Society, Los Angeles 1982.
Structured Computer Vision, Ed. Tanimoto and Klinger, Academic Press, New York 1980.
Computer Architecture for Pattern Analysis and Image Database Management, IEEE Computer Society Press, Hot Springs 1981.
Image Processing System Architectures, Kittler & Duff, John Wiley & Sons, Inc., New York 1985.
Multiresolution Image Processing and Analysis, Ed. A. Rosenfeld, Springer-Verlag, New York 1984.
Image Reconstruction from Projections, Gabor T. Herman, Academic Press 1980.
Basic Methods of Tomography and Inverse Problems, Langenberg and Sabatier, Adam Hilger, Philadelphia 1987.
U.S. Pat. No. 2,940,005 issued Jun. 7, 1960, Inventor: P. M. G. Toulon.
Principles of Interactive Computer Graphics, Second Ed., Newman & Sproull, McGraw-Hill Book Company, New York 1979.
Advances in Image Processing and Pattern Recognition, Elsevier Science Publishers B. V., Amsterdam, 1986.
Image Recovery Theory and Application, Henry Stark, Academic Press, Inc., New York 1987. Handbook of Pattern Recognition and Image Processing, Ed. Tzay Y. Young, Academic Press, Inc., New York 1986.
Fundamentals of Interactive Computer Graphics, Foley and Van Dam, Addison-Wesley, New York, 1982.
Real Linear Algebra, Anatal E. Fekete, Marcel Dekker, Inc., New York 1985.
Finite Dimensional Multilinear Algebra, Parts I & II, Marvin Marcus, Marcel Dekker, Inc., New York 1973.
Sparse Matrix Computations, Ed. Bunch & Rose, Academic Press, Inc., New York 1976.
Matrix Computations and Mathematical Software, John R. Rice, McGraw-Hill Book Company, New York 1981.
The Architecture of Pipelined Computers, Peter M. Kogge, McGraw-Hill Book Company, New York 1981.
Digital System Design and Microprocessors, John P. Hayes, McGraw-Hill Book Company, New York 1984.
Digital Filters and the Fast Fourier Transform, Ed. Bede Liu, Dowden, Hutchenson and Ross, Inc., Stroudsburg 1975.
Hardware and Software Concepts in VLSI, Ed. Guy Rabbat, Van Nostrand Reinhold Company, Inc., New York 1983.
Digital Signal Processing, Oppenheim and Schafer, Prentice Hall, Inc., Englewood Cliffs 1975.
Movements of the Eyes, R. H. S. Carpenter, Pion, Limited, London 1977.
Service Manual: DCX-30003-Chip CCD Video Camera, SONY Corporation.
Color Television: Principles and Servicing 1973.
Multi-Dimensional Sub-Band Coding: Some Theory and Algorithms, Martin Vetterli, Signal Processing 6 (1984) 97–112, Elvsevier Science Publishers B. V. North-Holland, p. 97–112.
The Laplacian Pyramid as a Compact Image Code, Burt and Adelson, IEEE Transactions on Communications, Vol. Com-31, No. April 1983, p. 532–540.

*Exact Reconstruction Techniques for Tree-Structured Subband Coders*, Smith & Barnwell, IEEE Transactions on Acoustics, Speech and Signal Processing, Vol. ASSP-34, No. 3 June 1986, p. 434–441.
*Theory and Design of M-Channel Maximally Decimated Quadrature Mirror Filters with Arbitrary M, Having the Perfect Reconstruction Property*, P. P. Vaidyanathan, IEEE Transactions on Acoustics, Speech and Signal Processing, Vol. ASSP-35, No. 4, April 1987, p. 476–492.
*Application of Quadrature Mirror Filters to Split Band Voice Coding Schemes*, Esteban & Galand, IBM Laboratory, 06610, La Gaude, France.
*Extended Definition Television with High Picture Quality*, Broder Wendland, SMPTE Journal, October 1983, p. 1028–1035.
In addition, for information on the state of general knowledge in fields related to computer science, one may consult *The McGraw-Hill Computer Science Series* (and *Series in Artificial Intelligence*) including, but not limited to, the following selected titles, all published by McGraw-Hill Book Company, New York in 1983 or before:
*The Design and Analysis of Computer Communication Networks*, Ahuja
*The Design and Analysis of Instruction Set Processors*, Barbacci and Siewiorek
*Computer Structures*, Bell and Newell
*Digital Computer Arithmetic*, Cavanagh
*Systems Programming*, Donovan
*Coordinated Computing*, Filman and Friedman
*Computer Organization and Programming*, Grear
*Introduction to the Design and Analysis of Algorithms*, Goodman and Hedetniemi
*Computer Organization*, Hamacher, Vranesic, and Zaky
*Computer Architecture and Organization*, Hays
*Digital Computer Systems Principles*, Hellerman
*Computer System Performance*, Hellerman and Conroy
*Microprogramming Primer*, Katzan
*Operating Systems*, Madnick and Donovan
*Mathematical Theory of Computation*, Manna
*Introduction to Simulation: Programming Techniques and Methods of Analysis*, Payne
*Matrix Computations and Mathematical Software*, Rice
*Software Engineering: Design, Reliability, and Management*, Shooman
*Computer Structures: Principles and Examples*, Siewiorek, Ball and Newell
*Introduction to Computer Organization and Data Structures*, Stone
*Computing: An Introduction to Procedures and Procedure-Followers*, Tonge and Feldman
*An Introduction to Computer Science: An Algorithmic Approach*, Tremblay and Bunt
*Discrete Mathematical Structures with Applications to Computer Science*, Tremblay and Manohar
*An Introduction to Data Structures with Applications*, Tremblay and Sorenson
*Programming Languages*, Tucker
*Knowledge-Based Systems in Artificial Intelligence*, David and Lenat
*Computers and Thought*, Feigenbaum and Feldman
*Problem Solving Methods in Artificial Intelligence*, Nilsson
*Artificial Intelligence*, Rich
*The Psychology of Computer Vision*, Winston Rather, what will be disclosed are novel algorithms for selecting and arranging the information transferred or transformed by those systems, devices and processes; or the selection and arrangement of information comprising various information products such as magnetic or optical media containing, or transmissions of, information bearing signals; as well as a method and device for the creation of images employing variable-geometry pixels which may be used to affect the foregoing or independently to great adcvantage. Disclosed will be what one skilled in the art will need to know, beyond that with which he is already familiar, in order to implement the instant invention. These algorithms and system designs will be presented by description, algebraic formulae and graphically, indicating how information data points or "pixels" are to be selected from data derived from a first information signal, and arranged, manipulated and/or combined to create the pixels or data points that will then comprise a second information signal; as is standard and frequent practice in the field of motion picture and television engineering.[2]

[2]. See, for example:
*Digital Video: Selections from the SMPTE Journal and Other Publications*, Society of Motion Picture and Television Engineers, Inc. (SMPTE), 1977.
*Digital Video Volume 2*, SMPTE 1979.
*Digital Video Volume 3*, SMPTE 1980.
*Extended Definition Television with High Picture Quality*, Broder Wendland, SMPTE Journal, October 1983, p. 1028–1035.

These descriptions, formulae and illustrations are such as to completely and clearly specify algorithms which may be implemented in a straightforward manner by programming a programmable computer imaging device such as a frame buffer.

For example, the programmable frame buffers (some with onboard special-purpose microprocessors for graphics and/or signal processing) suitable for use with personal computers, workstations or other digital computers, along with off-the-shelf assemblers, compilers, subroutine libraries, or utilities, routinely provide as standard features, capabilities which permit a user to (among other tasks): digitize a frame of a video signal in many different formats including higher-than-television resolutions, standard television resolutions, and lower-than-television resolutions, and at 8- 16- 24- and 32-bits per pixel; display a video signal in any of those same formats; change, under program control, the resolution and/or bit-depth of the digitized or displayed frame; transfer information between any of a) visible framestore memory, b) blind (non-displayed) framestore memory, and c) host computer memory, and d) mass storage (e.g., magnetic disk) memory, on a pixel-by-pixel, line-by-line, or rectangle-by-rectangle basis.[3]

[3]. For example:
PIP-512, PIP-1024 and PIP-EZ (software); PG-640 & PG-1280; MVP-AT & Imager-AT (software), all for the IBM-PC/AT, from Matrox Electronic Systems, Ltd. Que., Canada.
The Clipper Graphics Series (hardware and software), for the IBM-PC/AT, from Pixelworks, N.H.
TARGA (several models with software utilities) and AT-VISTA (with software available from the manufacturer and Texas Instruments, manufacturer of the TMS34010 onboard Graphics System Processor chip), for the IBM-PC/AT, from AT&T EPICenter/Truevision, Inc., Indiana.
The low-end Pepper Series and high-end Pepper Pro Series of boards (with NNIOS software, and including the Texas Instruments TMS34010 onboard Graphics System Processor chip) from Number Nine Computer Corporation, Massachusetts.

Thus, off-the-shelf devices provide the end user with the ability to: digitize high-resolution video frames; access the individual pixels of those frames; manipulate the information from those pixels under generalized host computer control and processing, to create arbitrarily processed pixels; and, display lower-resolution frames, suitable for recording, comprising those processed pixels. These off-the-shelf capabilities are sufficient to implement an image processing system embodying the information manipulation algorithms or system designs specified herein.

Similarly, higher performance and throughput (as well as higher cost and more programming effort), programmable devices, suitable for broadcast or theatrical production tasks, provide similar and much more sophisticated capabilities, including micro-coding whereby image processing algorithms can be incorporated into general purpose hardware, are available as off-the-shelf programmable systems.[4]

[4]. For example:
FGS-4000 and FGS4500 high-resolution imaging systems from Broadcast Television Systems, Utah.
911 Graphics Engine and 911 Software Library (that runs on an IBM-PC/AT connected by an interface cord) from Megatek, Corporation, California.
One/80 and One/380 frame buffers (with software from manufacturer and third parties) from Raster Technologies, Inc., Massachusetts.
Image processing systems manufactured by Pixar, Inc., California.
And many different models of graphic-capable workstations from companies such as Apollo, SUN and Silicon Graphics, Inc.

Additionally, specialized (graphic and image processing) programmable microprocessors are available for incorporation into digital hardware capable of providing special-purpose or general-purpose (user-programmable) image manipulation functions.[5]

[5]. For Example:
GMP VLSI Graphics Microprocessor from Xtar Electronics, Inc., Illinois.
Advanced Graphics Chip Set (including the RBG, BPU, VCG and VSR) from National Semiconductor Corporation, California.

TMS34010 Graphics System Processor (with available Software Development Board, Assembly Language Tools, "C" Cross-Compiler and other software) from Texas Instruments, Texas.

Further, it is well known by those skilled in the art how to adapt processes that have been implemented as software running on programmable hardware devices, to designs for special purpose hardware, which may then provide advantages in cost vs. performance.

In summary, the disclosure of the instant invention will focus on what is new and novel and will not repeat the details of what is known in the art.

Additionally, in the disclosure, a number of specific processes, devices or systems into which the algorithms of the instant invention can be incorporated, and applications to which the algorithms of the instant invention can be applied, will be pointed out. The intended practitioner of the instant invention is already skilled in the art of: building and/or programming some one (or more) of these devices; integrating and/or programming for some one (or more) of these systems; implementing (and/or utilizing to create information product) some one (or more) of these application systems; or, designing processes and devices to manipulate information that has been modified by random noise or some specified process in order to counteract that manipulation to some degree, including encoding, decoding, reconstruction, compression and decompression.

As such, the intended practitioner has within their skill in the art the knowledge to design and create and/or use such devices, processes or systems which "push pixels around" from some first or source information bearing signal, in a specified manner, to create a second or destination information bearing signal.

Examples include, without limitation: special purpose hardware or programmable devices that permit the implementation of specific or arbitrary image processing functions (for example, image filtering, blurring, sharpening, warping, zooming, sizing, tilting, compositing, wiping, keying, matting, texture mapping, colorization[6], posterization, etc.); and, hardware devices that transfer or transform information, including image streams, from a source form to a destination form (encoders, decoders, cameras, recorders, players, displays, switchers, timebase correctors, noise reducers, compressors, decompressors, modulators, demodulators, etc.).

[6]. Such as Inventor's own film colorization system subject of U.S. Pat. No. 4,606,625 issued Aug. 19, 1986.

The intended practitioner is already in command of the knowledge required to design and build such devices and application systems that select, arrange and manipulate the pixels of image streams, in various previously specified manners. What is provided herein is the specification for a novel manner for selection, arrangement and manipulation of the pixels comprising such image streams. What is claimed as inventive are these algorithms and/or the incorporation of the novel algorithms into an otherwise standard device.

For example, Inventor's own film colorization system (U.S. Pat. No. 4,606,625) discloses a system comprising all the elements needed to input an image stream, process it by applying colorization and other digital filtering algorithms, and output a processed image stream. Replacing the colorization process or algorithm element of that prior invention with some one of the algorithms herein would result in a system for practicing the encoding envisioned herein on an information bearing signal derived from motion picture film or video.

Additionally, in the disclosure, it will be pointed out that a number of the parameters (e.g., the set five weights Ka, Kb, Kc, Kd and Kx for the 4+1:1 pattern) can be varied, and may be adjusted or "fine tuned". It is common practice for users of television imaging systems to adjust or "fine tune" operating parameters via physical controls or data entry. For example, with a computer image processing capability (such as those provided with computer paint systems or special effects systems—e.g., digital filters that blur, sharpen, colorize, posterize, size, stretch, warp or otherwise manipulate an image or image stream) it is common practice for a practitioner to adjust various parameters that control the processing results via numeric keyboard input, or by physical or graphic controls. Considerable time may be spent making adjustments to the process, for any particular image input to the system, to achieve the desired results. The determination of what constitutes such desired results, and when those goals have been adequately approximated are, in the motion picture and television industry, most often a matter of subjective artistic taste; what one practitioner (or, more importantly the creative director to whom he reports) may deem successful, might be entirely unacceptable to another team. The specific adjustments made, will vary from case to case and will depend upon both the characteristics of the source material and the results hoped for after processing. How the system parameters should be adjusted is often not known ahead of time. Parameters are adjusted until a desired result is achieved or approximated.

Further, some image processing systems, such as Inventor's own film colorization system (U.S. Pat. No. 4,606,625) permit the application of algorithms with separately adjusted parameters (such as color specification or digital filtering parameters) to be applied to distinct areas of images in an image stream. Typically (in Inventor's systems) parameters are specified and adjusted in a small percentage of images from a moving sequence; the computer being capable of interpolating the practitioner's instructions for the intervening frames. Thus, it is not only common practice to fine tune parameters for a particular image, but also for individual areas of a given image.

Further still, it is common practice to "color correct" each individual scene of a motion picture film as it is printed, or transferred to video. Considerable time and effort, by highly skilled practitioners, is spent adjusting the parameters separately for individual scenes to achieve a desired overall "look".

Thus, in commercial applications of motion picture and television image manipulation processes, large amounts of time, effort and expense are expended in experimenting with the adjustment of operational parameters in an effort to achieve, as closely as reasonable, a desired result. And, this may be done for individual images, image sections, or motion scenes.

One of the major applications intended for the instant invention is the incorporation of the algorithms disclosed herein into a film chain (a film to video transfer device). Such transfers are an important and costly part of the television motion picture industry. Much time and effort is expended in achieving desired and artistic results. And, in particular, as described above, the scene-by-scene color correction of such transfers is common practice.

Thus, in the instant disclosure, it will be suggested that practitioners make adjustments to the operational parameters of the disclosed algorithms in order to better achieve desired results. Further, it will be suggested to such practitioners that such individual adjustments may be applied to images or image portions exhibiting different characteristics.

Commercial black & white and, later, color television has been available since the 1940s. American and Japanese systems offer 525 line frames, 30 times each second, while most European systems offer a higher resolution 625 line frame but run at a frame rate of 25 per second. Higher resolution military and laboratory video systems exist and, recently, a commercial high definition television standard (HDTV) has been developed to improve delivered image quality.[7]

[7]. *The Media Lab: Inventing the Future at MIT*, Stewart Brand, Viking Press, New York 1987, page 72.

In the US, motion picture film is projected at 48 frames per second (FPS) by showing each of 24 pictures twice. Recently, a system was developed by Douglas Trumbull called Showscan. It provides 60 FPS, with 60 pictures each shown only once, to improve visual quality.

When color was added to US black & white television, it was decided to adopt a "compatible" system, which enables black & white sets to receive color television signals and display them in black & white, while color sets display the same signals in color. Similarly, it has been suggested that the HDTV signal be compatibly receivable by standard televisions displaying standard resolution pictures, as well as by HDTV receivers. HDTV provides both more video lines and more pixels (from PICture ELements: visual data points) per line. It has been suggested that the standard television channels may be used to transmit a "compatible" standard resolution signal while a second channel (not receivable by a standard television) be used to transmit the "inbetween" higher resolution information. However, HDTV may also display a wider picture when compared with standard television. Inclusion of the extra "side strips" in a compatible broadcast system has been one of the main problems.

It is established practice to transmit motion picture film, which has a much higher resolution and a different frame rate, over a broadcast television channel by use of a film chain. Essentially a motion picture projector coupled to a television camera, the film chain synchronizes the two imaging systems. In newer film chain systems the video camera has been replaced by a digital image sensor and digital frame store. In the US, each video frame consists of two interleaved video fields, resulting in 60 fields per second. US film runs at 24 frames per second. This results in a ratio of 2.5 video fields per film frame. Practically, this is achieved by alternating 3 repeated video fields and 2 repeated video fields for alternate film frames. The spatial resolution of the image is reduced by the characteristics of the video camera.

It is also established practice to generate synthetic television signals (without a camera) by using electronic devices such as character (text) generators, computer graphic systems and special effects generators.

Recent developments in home televisions and VCRs include the introduction of digital technology, such as full-frame stores and comb filters.

There exist many techniques for bandwidth compression of electronic signals, a number of which have been applied to television systems. These are particularly useful for transmitting images from space probes or for satellite transmission, where resources are limited.

In addition, both hardware and software are available to affect an image compression technique called run-length encoding, whereby horizontal runs (generally 1 to 256 long) of pixels are represented as a color and length. This technique is particularly useful to reduce the memory requirements of images that have large areas of uniform color, e.g., cartoon-like images.

Recirculating framestore memory designs and devices are well-known whereby memory, after it has been used to display part of an image, is reassigned to later lines of the image. Generally, this is used to permit a small amount of memory to be used to display a full frame. It is often used in devices such as "window" timebase correctors which are used to synchronize a video input signal with some other video output, when the two are expected to be within a relatively small time shift (generally, much less than one full frame time).

DESCRIPTION OF INVENTION

The instant invention relates to a method of signal encoding that is particularly useful for preparing a high-definition television signal for transmission over a channel intended for lower resolution signals. It can also be used to improve the perceived quality of television systems, or for other purposes.

In brief, the invention comprises a system for selecting a subset of information to be transmitted, from all the information in a frame, and for varying the parameters of selection from frame to frame. This results in the reduction of transmitted information, and improved perception on the part of the viewer when compared to non-varying selection schemes. In addition, techniques and systems to accomplish the creation of images employing variable-geometry pixels as applied to digital data derived from information bearing signals are described, to affect the foregoing, but which also can be independently practiced to great advantage.

In order to understand the invention more fully, it is helpful to examine certain aspects of film and video display systems, their shortcomings, and the functioning of the human visual system.

Theory Of Operation

The basis of the instant invention is that the human visual system is capable of, and sometimes even works better by, reconstructing information that is presented over time.

A simple example of this involves a picket fence. If a viewer looks fixedly through a picket fence, about half the scene will be hidden from view and the pickets will be clearly defined. However, if the viewer shifts the head back and forth, or walks briskly by the fence, the perception will be of seeing the entire scene, even though half the scene will be missing at any given instant. The pickets will also become less noticeable. The human eye/brain system is capable of reconstructing the scene from the stream of partial views and of disregarding the sampling scheme imposed by the (relatively moving) pickets.

In the parlance of this application, both these cases constitute bandwidth compression (half the scene is hidden at all times); but, the fixed view is a static STS, and the moving perspective view is a variable STS. Thus, the eye is capable of reconstructing information presented through a varying sample window.

Other aspects of human vision indicate that varying information is preferable to static information. As described above, repeating identical information to the eye, as with theatrical motion picture film projection, creates the perception of muddiness or opacity. Certain structures in the retinex, such as edge detectors and motion detectors, only work in differential mode. That is, they do not work when presented with information that is temporally or spatially uniform. Another (although, longer term) phenomenon is visual fatigue or after-imaging. The receptor elements in the eye become exhausted by looking at a fixed image. The scene will eventually become almost invisible (if the view remains constant) and a negative of the scene will be perceived upon finally looking away.

The human eye vibrates with a continuous tremor of 30 to 80 Hz. during its normal function. The retinex is able to reconstruct a stable detailed image from this vibrating input. It may, in fact, yield a more detailed image than could be constructed from an absolutely stable eye and may help prevent the perception of the structure of, or defects in, the retinex itself.[8]

[8]. Also referred to as microsaccades; see, for example: *Movements of the Eyes*, R. H. S. Carpenter, Pion, Limited, London 1977.

A similar situation results from the way in which motion picture film is manufactured and used. Film images are made up of a random distribution of photosensitive particles collectively called "film grain". When blown-up on a large screen the grain structure would be more easily seen, however, because the distribution changes from frame to frame the grain structure is generally not perceived. There are two ways that still images are added to motion picture presentations. With one technique a still scene is filmed on a number of film negative frames. Each has a different grain structure and, thus, when the sequence is projected (or viewed on a video monitor) the film grain structure is not noticed. The other technique calls for "step printing" the same film negative on many frames of the print to be projected (or to repeatedly scan the same film frame in a film chain). In this case the same film negative frame, with the same grain structure, is viewed repeatedly and the grain structure becomes more noticeable. The frames of the motion picture print also have grain structure, however, since this structure always changes (unless the projector jams or is stopped) the print film grain structure is not noticed.

The tremor function provides variation to the STS of human vision. Thus, the retinex may be better suited to deal with variable STSs than static.

The retinex has the ability to reconstruct a scene from bits and pieces spread over space and time. It is possible to take advantage of this ability by presenting a succession of moderate bandwidth pictures (subsets of full-definition images), taken through varying sample windows, and to have the retinex reconstruct a higher resolution scene.

Thus, for some embodiments, the compressed transmitted data points will be directly displayed on a monitor of resolution that is comparable to the transmission channel. Reconstruction, or collection, will occur in the retinex. Improved perception will result, when compared with standard transmission over the same channel and display. Thus, the technique may be used to improve perception of material transmitted for standard systems. It is only the camera and/or transmission parts of the system that would be replaced; standard reception and display elements would be used in this embodiment. This is in marked contrast to most bandwidth compression techniques, which utilize complex coding schemes that require complex decoding before display. For example, an image compressed by run-length encoding would appear as gibberish if the data were displayed directly, without proper decoding.

Other embodiments will present the results on a higher definition (compared to the channel) display. The "holes" between the transmitted points may be smoothed over by interpolative techniques, or intermediate data may be (approximately) "reconstructed" by computation.

Referring to FIG. 1, the top configuration (100–104) depicts a standard encoding/decoding (101/103) bandwidth reduction scheme. The bandwidth of the source (100) and display image (104) are equal and higher than the bandwidth of the channel (102).

The bottom configuration (110–114) depicts one class of embodiments of the instant invention. The bandwidth of the source image (110) is higher than both the channel (112) and the display (113) which are comparable to each other. Decoding (114) occurs after display (113), as it is viewed (114), and it is only in the retinex (114) that the image is reconstructed.

The goal of most bandwidth compression schemes is to "squeeze" a given information signal into a smaller channel. A main goal of the instant invention is to "squeeze" (111) a larger picture into a given channel. Although this may at first sound as a semantic difference only, there is a significant practical difference.

Broadcast television in the US is a "given channel" that is unlikely to change for the foreseeable future. Bandwidth compression schemes that would allow the use of a smaller transmission channel (102) and require complex decoding at destination (103) could not be used with the many millions of existing home receivers (e.g., 104). The bottom configuration (110–114) shown in FIG. 1 requires no decoding equipment prior to display (113); decoding is accomplished in the human eye/brain (114). Therefore, it can be used with existing distribution and reception/display equipment (113).

It should also be noted that the "channel" (112) shown in the bottom part of FIG. 1, can incorporate a standard encode-transmit-decode system (101–102–103), as shown above. In this way, the varying STS scheme (e.g., 111) will function as a pre-selection or thinning function, prior to applying some other compression algorithm (e.g., 101), such as run-length encoding, delta encoding, etc.

Static Sampling Schemes:

The visual artifacts of film and video systems are perceivable because the STS of each system is constant. Many times each second, images are presented to a viewer. While these image streams approach viewing a real scene, they represent only a small subset of the available information. The way in which the subset of information is selected remains constant, frame after frame after frame, while the content of each frame is different. In this way the "shape" of the STS is re-enforced by being superimposed over many different images. Perceived visual anomalies result.

In order to select a subset of a relatively high-resolution television signal for transmission over a lower bandwidth channel, two straightforward approaches are depicted in FIG. 2 and FIG. 3.

In both cases, the reduction is by a factor of four; by half in both the horizontal and vertical directions. Two-by-two cells of pixels are labeled with subscripts representing the row and column of the cell. Within the cell, individual pixels are labeled A, B, C and D.

In the FIG. 2, the upper left corner element (A) of each two-by-two pixel cell, is transmitted (*) for every cell, in every frame of the source image. This pixel value is used to reconstruct the entire destination cell in the destination image. Picture details that fall in pixels labeled B, C or D do not get transmitted or displayed at all. As a small visual detail moves across the screen it would pop on (as it passes A*) and off (as it passes B, C or D).

In FIG. 3, all four picture elements from each two-by-two cell in the source image are averaged, as by a low-pass digital filter, to derive the pixels of the destination display cell. The average of A, B, C & D is denoted by X. Here individual small details are lost as they are averaged with the neighboring three pixels.

Both approaches exhibit defects. In the first, small details pop on and off, in the second, small detail is lost in the blur. This is because the method of selecting the subset of information—the STS—is constant from frame to frame. The "shape" of the static STS is re-enforced by viewing changing content upon which the same STS is repeatedly imposed.

Varying the STS:

Although each is unique, the successive frames of a standard film or video presentation each have much redundant information in common with their neighbors. The STS of the present invention varies from frame to frame. By this scheme, the differences in the STS that is applied to successive frames is comparable to, or will even exceed, the differences in the content of successive frames. Therefore, the shape of the STS will not be re-enforced from frame to frame. Thus, sampling artifacts will be obscured, as they change from frame to frame, and the perception of visual anomalies, resulting from the overall varying sampling scheme, will be minimized.

The reader is directed to consult the parent application, of which the instant application is a continuation-in-part, for further details.

Frame Store Techniques:

For a single still image, 4:1 bandwidth compression may be achieved by the processes depicted in FIG. 2 or in FIG. 3 for each transmitted frame. In either case, the same source image will be processed according to the same STS for each frame, resulting in a repeat of an identical destination frame. For the simple case of the instant invention, depicted in FIGS. 4A through 4D, 4:1 compression is also achieved but with improved perception on the part of the viewer. Four different destination frames are derived from the same source image, using the varying STS, and presented in sequence. (In any of the above three cases, post-transmission filtering, such as bi-linear interpolation, may be used to improve image smoothness).

However, if it were known that a still image were to be transmitted for a number of frame times, the simple varying STS scheme depicted in FIGS. 4A through 4D could be adapted to a variation that will provide further benefits. Assuming that the destination display incorporates some digital frame-store[9] or other memory function, the information from all four frames can be accumulated and used to completely reconstruct the original high-definition source image. This "accumulation mode" would not provide similar benefits if implemented with either of the two static STS schemes depicted in FIGS. 2 and 3, since the information from successive frames would be identical.

[9]. See note 2.

With this scheme, once four frames were collected the oldest of the four could be discarded and replaced by the newest as it came in. The same principle could be applied to other patterns or distributions of data points and the scheme may be varied (as described below) over the frame or over time.

Another technique can be implemented on a relatively high-definition display with a built-in frame store. Normally, a frame store provides data storage for each pixel that can be displayed by the monitor[10]. However, by using the varying STS technique, bandwidth is compressed by transmitting data for only a sub-set of display points. Only some of the memory locations in the frame store would be required to store incoming data for an image frame. (Additional pixels could be used to hold data from previous frames, as in the accumulation mode described above; or, to hold intermediate data points created at the destination display.)

[10]. See, for example:
*Fundamentals of Interactive Computer Graphics*, Foley and Van Dam, Addison-Wesley, New York, 1982.
*Principles of Interactive Computer Graphics, Second Ed.*, Newman & Sproull, McGraw-Hill Book Company, New York 1979.

By this scheme, the number of pixels (i.e. resolution) in the frame store would not need to be as high-definition as the display, at any given frame. However, since, over the course of many frames, data will be sent for all (or many) of the points that can be displayed on the high-resolution monitor, data storage points would be required for all those display points. This is because, in standard frame stores, a stored information point can only be displayed at one specific display point. Therefore, the resolution of the frame store would need to be comparable to that of the display, to accommodate the different points at different positions to be displayed over time.

The technique described below will allow a low-resolution frame store to be used with a high-resolution display when implementing a variable STS scheme. The scheme described in FIGS. 4A through 4D will be used as an example. For each 2×2-pixel-cell only one data point is transmitted at each frame and is displayed at the destination position that it occupies in the source image. The other three are derived from repeated data, or intermediate data derived by interpolation or reconstruction. While storage for all four pixel positions in the display cell are needed over time, only one of four is needed at each frame. If the position of the display point associated with the information storage point could be moved, then one storage space per multi-pixel cell would suffice.

In standard frame store devices, display data is read from digital memory and used to specify the color and/or intensity of pixels on the screen. The "look" of the displayed pixel is determined by the data contents of the associated memory location; the position of the displayed pixel is determined by the address of the memory location[11]. In some frame stores several different modes are available that "map" the memory locations to display screen locations in different ways. But for each mode the mapping is constant from frame to frame[12].

[11]. See note 13.
[12]. See note 3.

A specialized frame store device would facilitate the implementation of the varying STS technique. It is described below. In the specialized frame store the "look" of the pixel is still determined by the contents of the memory location. However, the location of the displayed pixel on the screen is determined by the address of the memory location plus an offset that can be determined in several ways.

One way would be appropriate to the varying STS scheme described in FIGS. 4A thorough 4D. In this case the position of the entire raster would be adjusted to coincide with the upper-left pixel of the multi-pixel cell for FIG. 4A. Similarly, for other frames, shifts would be made to coincide with the upper-right, lower-right and lower-left for FIGS. 4B, 4C and 4D, respectively. Other patterns may also be used to "wobble" the entire display. These would be synchronized with a corresponding "wobble" in the video camera or transmission system.

In another implementation the "wobble", perturbation or offset would be applied independently to individual pixels, or groups of pixels. Groups of pixels may correspond to small geometric areas (neighboring pixels or multi-pixel cells, for example); or a group may consist of a distribution of pixels spread out over a large section of, or an entire, image frame. In this case the complex pattern of offsets for each frame could be pre-determined and synchronized with the camera or image creation system.

Alternately, pixel (or pixel group) position offset data could be stored along with pixel content data in the frame store. The display location of a pixel would then be determined by the address of the memory location and an offset that was stored and associated with the individual pixel or pixel group. A specific case for 2×2 multi-pixel cells is described next.

In standard frame stores pixel content data is stored for each pixel. For example, if eight bits each were required for Red, Green and Blue display data, each pixel would require 24 bits and the 2×2 cell would require 96 bits of data storage (24 bits for each of four pixels). In the specialized frame store 24 bits would be required for display content data (8 each for Red, Green and Blue). An additional 2 bits would be stored with each 24-bit pixel data. These two bits would be used, for example, as follows:

| EXTRA BIT 1 | EXTRA BIT 2 | PIXEL DISPLAY LOCATION |
|---|---|---|
| 0 | 0 | Upper-left pixel of cell. |
| 0 | 1 | Upper-right pixel of cell. |
| 1 | 0 | Lower-left pixel of cell. |
| 1 | 1 | Lower-right pixel of cell. |

In this way, for each 2×2-pixel cell, storage requirements have been reduced from 96 bits to 26 bits. If groups of 2×2 pixel cells were to be offset in like manner, the 2-bit position specification would only have to be stored once for the entire group.

When this type of frame buffer is used with a monitor, the offset may be applied to the electron beam deflection mechanism[13] to implement the wobble of the entire image or individual pixel elements. Beam de-focussing may also be applied to cover the "holes" between transmitted pixel data.

[13]. See, for example: *Color Television: Principles and Servicing* 1973; and, Note 13.

Another technique may be used to fill the holes, or to other benefit. Besides adjusting the position of displayed pixels, the size or shape of pixels can also be adjusted. Again, these adjustments to the pixels may be designated by pre-determined pattern or from data stored with the pixel content data, and may be applied to individual pixels, pixel groups or to an entire frame uniformly. For example, one particular information point may be displayed as a single pixel one time, and as a 2×2 square in another frame. Or, one data point may be displayed as a single pixel in one frame, as a two-by-one pixel block in another frame, and as a one-by-two pixel block in still another frame.

Alternately, and particularly with higher-resolution monitors, intermediate display data would be created to fill the "holes" between transmitted pixel data. This may be done using a digital (or analog) filter to perform simple interpolation or by a more complex reconstruction algorithm. The creation of the intermediate data could be done on the fly, by accessing several data points from the frame store and computing intermediate values. But a low-cost frame store may not provide fast enough data access for complex point-oriented display processing. Therefore, several lines of frame store data may be transferred to a smaller amount of very high-speed memory. This high speed memory can also be of higher resolution (then the rest of the frame store) so as to provide a place to temporarily store the calculated intermediate display data, until they are displayed.

Multiple frame stores, of either standard or specialized construction, can be contained in a single display. They can be used to advantage if implementing a complex interpolation or reconstruction algorithm. For example, one frame store can be used to compute the incoming frame while another frame store is being scanned out to display the previous frame. Two frame stores can be alternated in this fashion, or more than two can be installed in a "pipeline" allowing several frame times to be used to process a frame, once it has been received.[14]

[14]. *The Architecture of Pipelined Computers*, Peter M. Kogge, McGraw-Hill Book Company, New York 1981.

Several frame stores can also be used to store several sequential incoming frames. These can then be displayed, in interleaved manner, to implement the accumulation mode, which can be applied to the entire image or in limited areas.

This discussion has made specific reference only to the sampling pattern described in FIGS. 4A through 4D. However, any of the patterns, techniques and variations described elsewhere in this disclosure can be used in conjunction with these frame store techniques.

Variable Algorithm Over Image Frame:

As described above, the varying STS principle may be implemented in numerous embodiments, which may be fine tuned for images or image sequences with different characteristics. For example, the "accumulation mode" described above may improve visual quality for image sequences that have little or no movement, for a period, or for images of text or graphics. It is also possible that certain images or image sequences will have different characteristics in different areas and that the shape or position of those areas will change, over time, from frame to frame.

Many image analysis techniques now exist and other useful techniques may continue to be developed. Similarly, techniques and algorithms now exist, and may later be developed, that can be used to encode area shapes, edges or boundaries. These algorithms and techniques can be used to analyze and specify various areas of different image characteristics. The analyses can be made on a single frame basis, or by comparing progression or change over two or more frames.[15]

[15]. See for example:
*Algorithms for Graphics and Image Processing*, Theo Pavlidis, Computer Science Press 1982.
*Computer Vision*, Ballard and Brown, Prentice-Hall, Englewood Cliffs 1982.
*Industrial Applications of Machine Vision*, IEEE Computer Society, Los Angeles 1982.
*Structured Computer Vision*, Ed. Tanimoto and Klinger, Academic Press, New York 1980.
*Multiresolution Image Processing and Analysis*, Ed. A. Rosenfeld, Springer-Verlag, New York 1984.
*Advances in Image Processing and Pattern Recognition*, Elsevier Science Publishers B. V., Amsterdam, 1986.
*Handbook of Pattern Recognition and Image Processing*, Ed. Tzay Y. Young, Academic Press, Inc., New York 1986.
*Digital Signal Processing*, Oppenheim and Schafer, Prentice Hall, Inc., Englewood Cliffs 1975.

Once a frame is analyzed and separated into multiple areas of different characteristics, different versions of the encoding technique can be used for those several areas. These variations of the encoding technique can be designed so that the encoded image can be decoded using a uniform decoding technique over the whole image.

Alternately, a multiplicity of fine tuned decoding algorithms can be used on different areas of the image. The shapes of the decoding areas need not be identical to the encoding areas. The different decoding areas may be determined by analysis at the destination display or, the decoding areas may be derived from area specification information, to be included with the image data in the transmitted signal or transmitted separately.

An image can be displayed with several decoding algorithms, even if it were encoded with a single uniform algorithm. For example, although an image stream were encoded uniformly, the accumulation mode algorithm can be applied to limited areas (with little or no movement, or containing text or graphic information), while elsewhere, information is discarded as soon as it has been displayed.

The method of specifying area shape can be varied depending upon: the encoding/decoding algorithm, image characteristics, the characteristics of camera, transmission or display equipment, or, constraints imposed by transmission bandwidth, computing power or time. For example, areas can be limited to groups of rectangles, triangles, polygons, or other shapes, or may be freely specified on any pixel, or multi-pixel cell, boundary. Limits can also be placed on the number of distinct areas in an image(s), or on the maximum change of area specification from frame to frame.

If the constraints of image complexity, time or computing power do not allow for real-time analysis and/or separation of images into areas, analysis can be done off-line[16] for certain applications. For example, a relatively long time may be spent on the analysis and encoding of the frames of a motion picture film, prior to transmission. The encoded results, perhaps with area specifications would then be stored on videotape (or other medium) for real-time playback, transmission, and display, at a later time. Alternately, frames can be computed, transmitted and recorded off-line, for real-time playback at a later time.

[16]. For example: the DQ-422 VideoGraphics Interface by Diaquest, Inc., California or a similar system from Lyon-Lamb will permit output from IBM-PC frame buffers to be recorded single frame to ¾" videotape recorders. Similarly, professional or "broadcast quality" solutions exist when using 1" or 2" high-band videotape recorders.

DESCRIPTION OF PREFERRED EMBODIMENTS

What follows is a detailed description of drawings that will illustrate several preferred embodiments of the instant invention.

Figure 5:
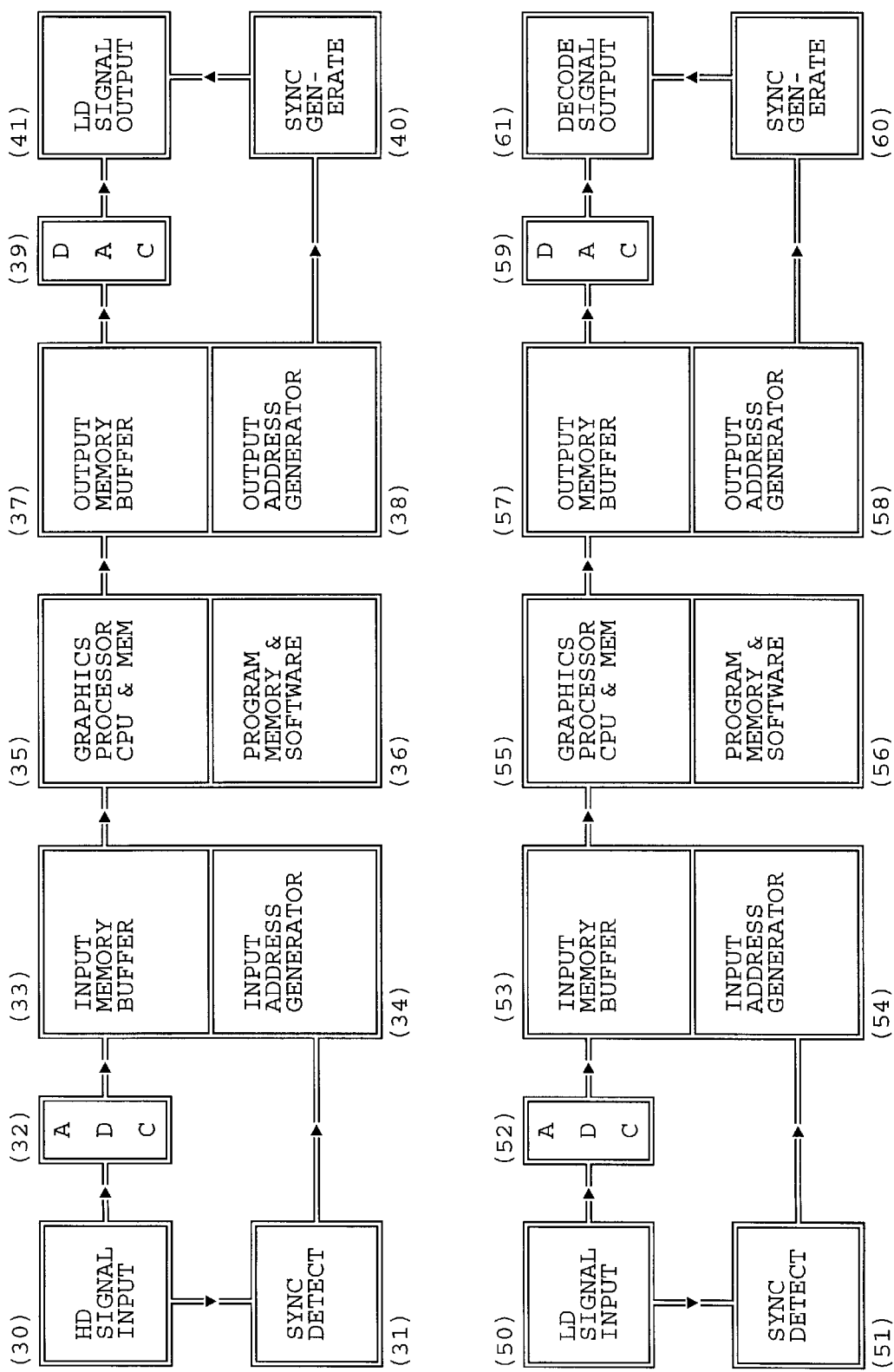
FIG. 5 depicts two block system diagrams of an implementation of a companion pair of a variable STS encoder (above) and decoder (below).
Figure 6:
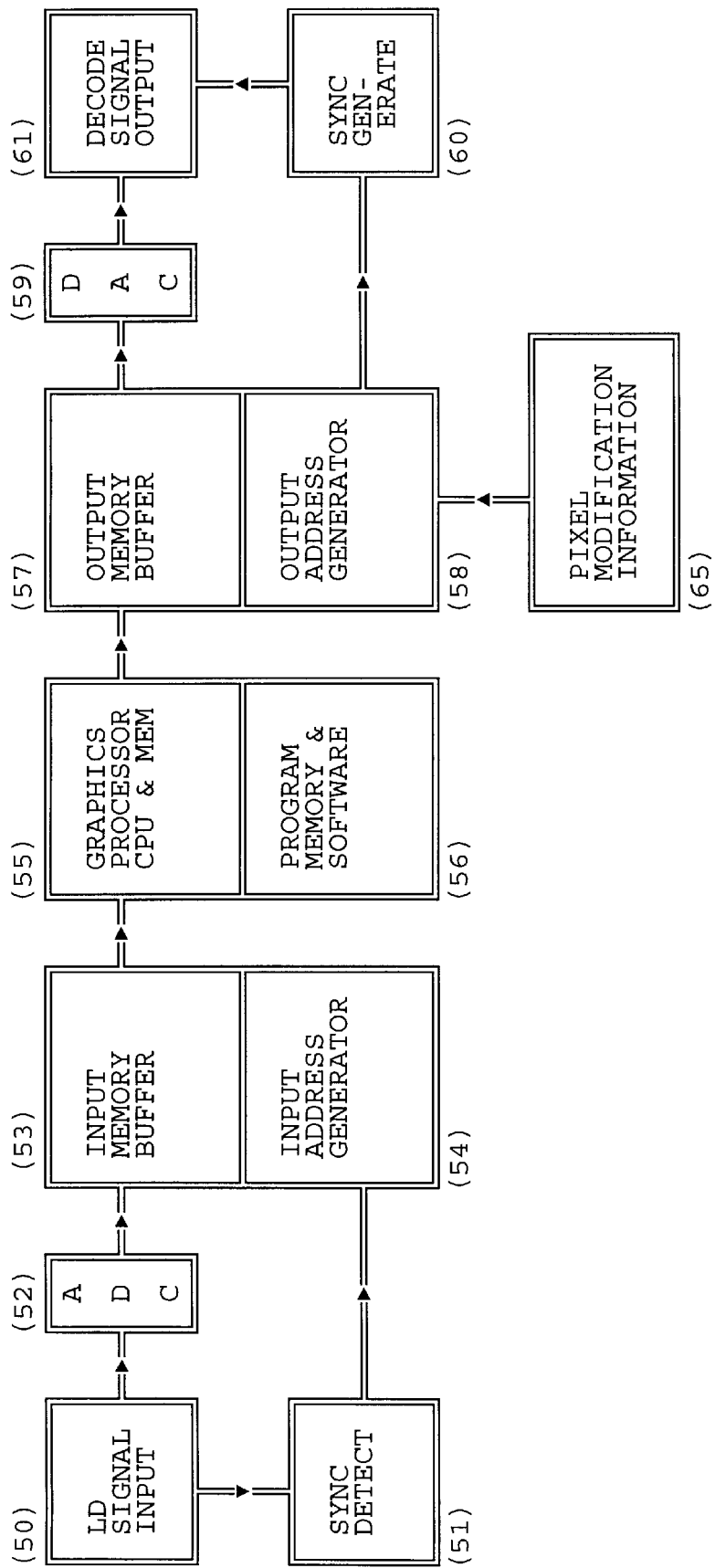
FIG. 6 depicts a variable STS decoder shown in block system form that is largely identical to FIG. 5 (bottom), with the addition of a pixel modification information element.

FIG. 5 consists of two block system diagrams of a more complex way to implement a companion pair of a variable STS encoder (above) and decoder (below).

The encoder consists of hardware elements that, taken together, constitute a standard type of computer display device known as a Frame Store or Frame Buffer. For example, elements 31 through 34 would constitute a scanning or digitizing frame buffer. If we extended the list to elements 31 through 36, it would be an "intelligent" scanning frame buffer. Similarly, elements 37 through 40, or 35 through 40, would constitute a display frame buffer or "intelligent" display frame buffer. Elements 31 through 40 would constitute an "intelligent" frame buffer capable of both digitizing and displaying, however, in that case elements 33 and 37 might be a combined into a single memory buffer.[7]

[17]. See, for example, the devices mentioned in Note 3 as having "onboard processor chips" or most of the devices or systems mentioned in Note 4.

Similar comments can be made about the hardware elements of the decoder 51 through 60.

Also note that there are four pairs of elements (33/34, 37/38, 53/54 & 57/58) each consisting of memory buffer and an address generator. For each pair, the two halves are interconnected and an input/output line communication with one element may be considered to communicate with both.

Similarly the computer and memory elements 35/36 and 55/56 are also interrelated.

Referring now to the encoder (above) the high-definition signal input (30) may consist of an HDTV camera, computer generated graphic or any other high-definition information source. If the signal is an analog signal it is converted to digital form by the analog-to-digital converter (ADC) element (32) otherwise, if the signal originates in digital form, this element may be removed. (Similar statements about the optionality of the other converter elements (39, 52 & 59) are implied by this and will not be repeated.)

The digital HD signal is then input to the input memory buffer (33). The choice of the addresses at which the individual signal samples are stored is made by the input address generator (34) which is synchronized by the sync detector (31) which extracts timing information from the HD signal input (30).

Depending upon the complexity of the particular encoding scheme to be implemented and the computational speed of the graphics processor CPU (35), the size of the input memory buffer (33) may range from a partial "window" of an input frame (as is common in the design of digital television TBCs—time base correctors), to an entire frame store, to storage for several frames as is described in the section entitled "FRAME STORE TECHNIQUES", above. It may even be reduced to size zero if the CPU (35) is very fast and/or the encoding scheme is very simple. (The same statements may be applied to the other memory buffers (37, 53 & 57) where appropriate.)

The graphics processor CPU (35) is a specialized, high-speed micro processor of which many now exist (for example, the Texas Instruments TI34010)[18] and which may also be called a DSP for digital signal processor. It generally will also have an amount of computational or "scratch pad" memory, or registers associated with it, as indicated by "& MEM" in (35). As is common practice in high speed computing, if additional speed or computing power is required, several CPUs may be employed to operate in tandem as a composite CPU (for example, the systems made by Broadcast Television Systems or Pixar)[19]. The graphics processor (35) also has associated with it additional program memory to hold software (36).

[18]. See Notes 3 and 5.
[19]. See Note 4.

Working from data input from the input memory buffer (33) the graphics processor (35/36) computes the encoded x'-point values, according to the variable STS encoding schemes or other techniques described herein by the accompanying text and diagrams, and places the results in the output memory buffer (37).[20]

[20]. Example of code implementing (4+1):1 variable STS encoding.

```
/*
This computer program implements a (4+1):1 sampling pattern, as described in
    figures 6 through 11 of the patent application.
The coordinate directions are called h and v, for horizontal and vertical, just
    to avoid possible confision between x coordinates and (x)-type pixels.
*/
#define NH       102    /* size of output image in h direction */
#define NV        96    /* size of output imahe in v direction */
#define NPHASE     4    /* number of phases */
#define NOTYP      4    /* number of (o)-type pixels for each (x)-type */
#define XSPACE     5    /* spacing in h or v of pixels in input image */
#define XWEIGHT    6    /* the weight of (x)-type pixels */
#define DENOM     16    /* the denominator of the weight function */
/*
For each phase, this table gives the offsets of the (o)-type pixels associated
```

```
    with each (x)-type pixel, and the weights they are to be given when
    computing the output pixel.
*/
struct sts(
    int hoffs, voffs;
    int weight;
        )sts [NPHASE] [NOTYPE]=
{
    2, -1, 4, -3, -1, 3,  2,  4, 2, -3,  4, 1, /* phase 1 of 4 */
   -1, -2, 4, -1,  3, 3,  4, -2, 2,  4,  3, 1, /* phase 2 of 4 */
   -2,  1, 4,  3,  1, 3, -2, -4, 2,  3, -4, 1, /* phase 3 of 4 */
    1,  2, 4,  1, -3, 3, -4,  2, 2, -4, -3, 1, /* phase 4 of 4 */
};
/*
stsresample computes a compressed image for a single frame, using an STS
    resampling scheme. The parameter 'phase' indicates which phase of the STS
    is in effect.
stsresample calls two routines not defined here;
    GetInputPIXEL (h, v) to get pixel values from the high-definition input image,
    PutOutputPixel (h, v, value) to set pixel values in the compressed output
    image.
*/
stsresample (phase)
{
    int h, v;       /* horizontal and vertical coordinates */
    int pixel;      /* the output pixel value at a particular (h,v) */
    struct sts *stsp;  /* pointer to sts information */
    int i;
    for(v=0; v<=NV; v++) {
        for (h=0 ;h<=NH; h++) {
            pixel=GetInputPixel(h * XSPACE, v * XSPACE) * XWEIGHT;
            sts = &sts [phase-1] [0];
            for(i=0; i!=NOTYPE; i++)
                pixel+=step->weight*GetInputPixel(
                    h*XSPACE+stsp->hoffs,
                    v*XSPACE+stsp->voffs);
            PutOutputPixel(h, v, Pixel/DENOM);
        }
    }
}
```

For some implementations either memory buffer (33 or 37 in the encoder, 53 or 57 in the decoder) may be absent, or both functions may be implemented by a common memory buffer. Also, the scheme described in the section entitled "FRAME STORE TECHNIQUES", above, which employs two separate frame stores may also be implemented as shown by buffers 33 and 37, or 53 and 57.

The data placed in the output memory buffer (37) by the graphics processor (35/36) may then be scanned out, under control of the output address generator (38), converted by the digital-to-analog converter or DAC (39), and output as a low-definition encoded data signal (41). The output signal (41) will also contain synchronization information, generated by the sync generator (40) based on timing information from the output address generator (38).

The combined, data and synchronization, encoded low-definition signal output (41) is then available for transmission, for recording on videotape, videodisc or other media, or for direct undecoded display in certain instances.

The operation of the variable STS decoder (below, 50–61) is virtually identical to that of the encoder (above, 30–41) except that: the low-definition signal input (50) is now the encoded low-definition output of the encoder (41) which is available via cable, radio transmission, from a storage medium or any other appropriate means; the graphics processor (55/56) now implements the variable STS decoding and reconstruction schemes or other techniques described herein by the accompanying text and diagrams; and, the output (61) is now a decoded/reconstructed signal which is available for display on a television monitor.

Referring now to FIG. 5, a variable STS decoder is shown in block system form that is largely identical to FIG. 5 (bottom), with the addition of pixel modification information element (65). This additional information may be derived from the LD signal input (50) and/or created by graphics processor (55/56); and it may be input to the output address generator (58) from information stored in the input memory buffer (53), information stored in the output memory buffer (57), or information generated or stored in the graphics processor (55/56).

The pixel modification information (65) will be used to modify the scanning of data from output memory buffer (57) as controlled by the output address generator (58) and/or to modify the synchronization signal part generated by the sync generator (60) and which is included in the decoded signal output (61). It will be used to modify geometric information about the display of individual pixels such as the position, size or shape of the pixel as displayed on a television monitor to which the decoded signal output (60) is sent.

FIG. 7 shows one example of a data structure which could be stored for each pixel of the input memory buffer (53) or the output memory buffer (57). For each pixel 8 bits of data would be stored representing any of 256 levels of red intensity (70), 8 bits of data representing one of 256 levels of green intensity (71), 8 bits of data representing one of 256 levels of blue intensity (72), and two bits representing pixel modification information (73). The two bits of pixel modification data would allow for a choice among four possibilities (00, 01, 10, 11); other numbers of bits in (73) would permit other numbers of choices. Two bits might be used to pick a position (upper left, lower left, upper right, lower right) for the pixel within a 2-by-2 pixel cell. It might be used to determine a shape/size for the pixel (1×1, 1×2, 2×1, 2×2). It might be used to modify how long a pixel was to be displayed (not at all, just once, twice, until replaced) for the "accumulation mode" as described herein; the "not at all" option allowing the RGB locations (70, 71 & 72) for that pixel in that data frame to be used for other purposes (for example, additional resolution, area boundary or side strip data, as described elsewhere herein). Or it might be used in other ways, as described herein, to modify the display characteristics of individual pixels in individual frames.

Figure 8:
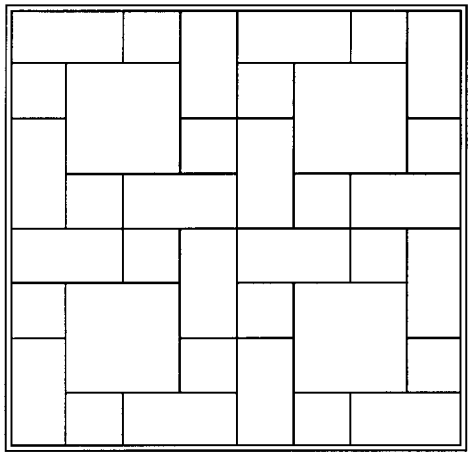
FIG. 8 depicts an example embodiment where two different arrangements of pixels are shown above and below, each employing four different shaped pixels. Two bits of data stored with the content information for each pixel would indicate: 00=1×1 cell, 01=1×2 cell, 10=2×1 cell, and 11=2×2 cell. For each arrangement the blank layout is shown on the left, and with pixel modification information on the right.
Figure 8:
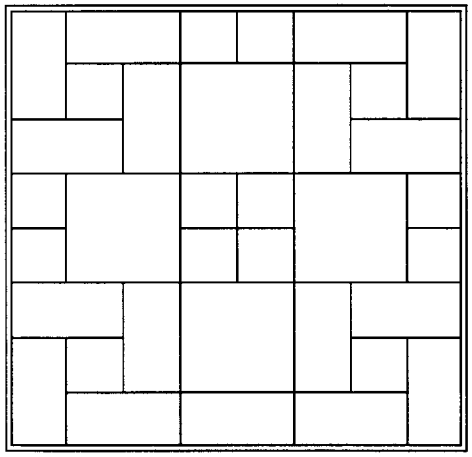

FIG. 8 shows one example of an embodiment of the instant invention described above in the section entitled "FRAME STORE TECHNIQUES". Here, two arrangements of pixels are shown above and below, each employing four different shaped pixels. Two bits of data stored with the content information for each pixel would indicate: 00=1×1 cell, 01=1×2 cell, 10=2×1 cell, and 11=2×2 cell. Each arrangement uses the same number of the various types of cells 16 of 00-type, 8 each of 01-type and 10-type, and 4 of 11-type. These, and other patterns may be alternated to implement a variable STS scheme.

Figure 9:
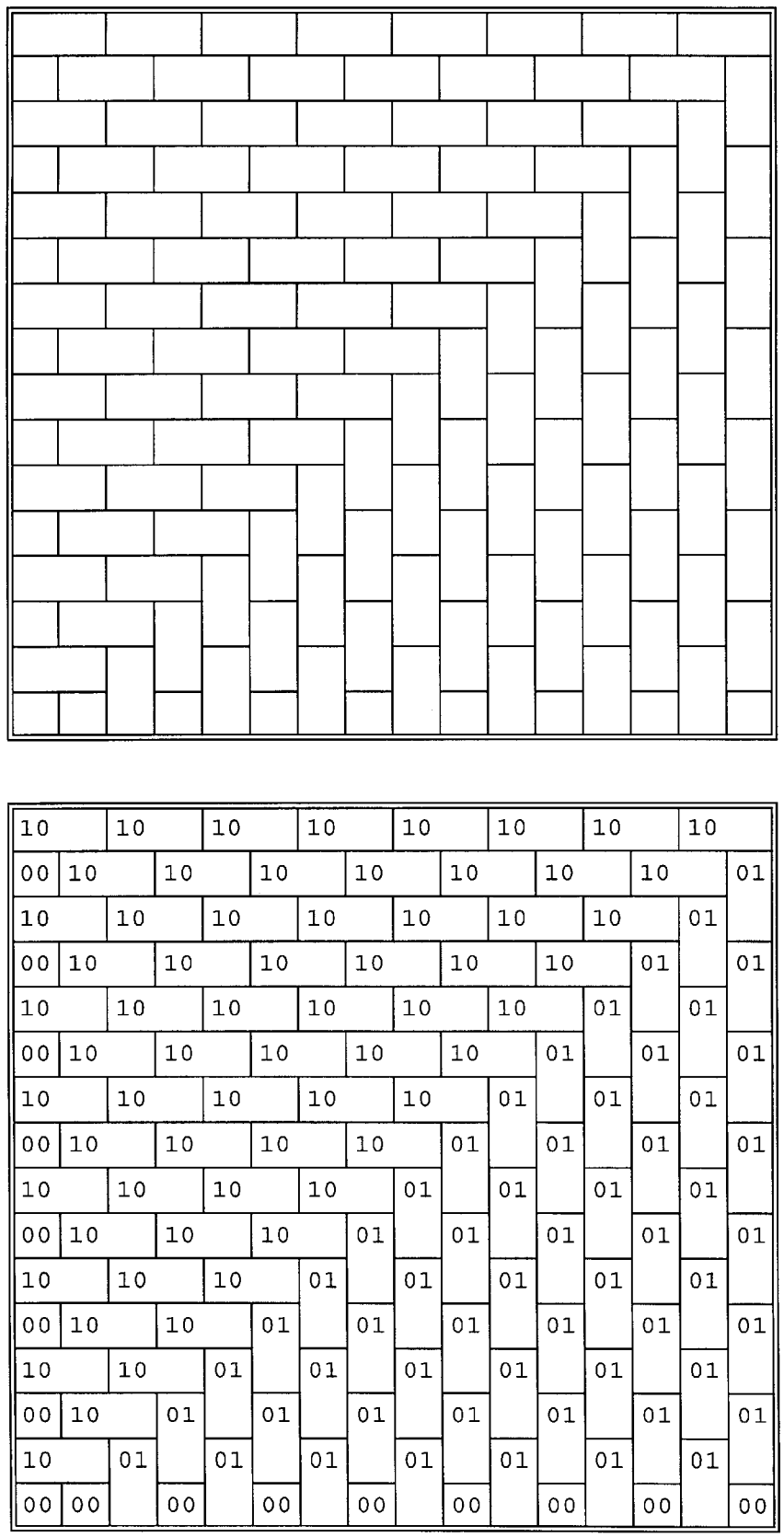
FIG. 9 depicts an example of how variously shaped picture elements may be used to create a pattern which exhibits better vertical than horizontal resolution in the upper-left-diagonal half, and better horizontal than vertical resolution in the lower-right-diagonal half.
Figure 11:
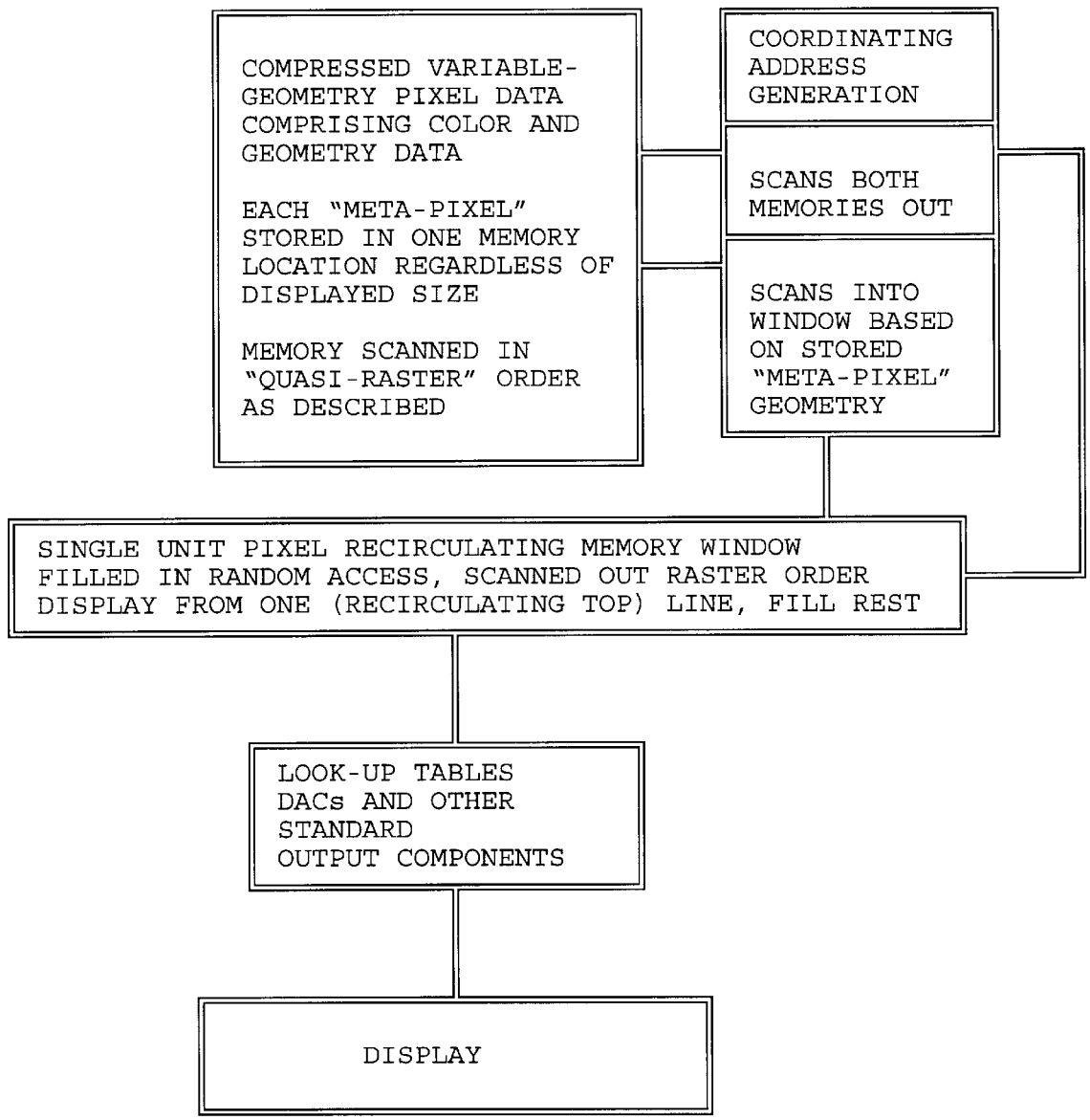
FIG. 11 depicts a high-level system diagram showing a recirculating window frame store memory.

FIG. 9 shows an example of how these variously shaped picture elements may be used to advantage with "imagery with horizontal, vertical or diagonal lines, edges or details" and as described above in the section entitled "VARIABLE ALGORITHM OVER IMAGE FRAME". Here a pattern is shown which exhibits better vertical than horizontal resolution in the upper-left-diagonal half, and better horizontal than vertical resolution in the lower-right-diagonal half. Although this pattern is extremely simple, it is meant to be illustrative only. In practice, such patterns may be varied in subtle and complex ways, over time, to implement some of the variable STS schemes as described herein.

Further Discussion:

As described, above, in the section SCOPE OF INVENTION AND PRIOR ART, techniques, hardware and software employing "run-length encoding" are well-known and well developed.[21] There, horizontal single-pixel-high runs of pixels are stored as a color and a length. Compression is achieved for "cartoony" images with large areas of uniform color.

[21]. These were first developed by Richard Shoup (Hardware) and Alvy Ray Smith (Software) to implement the first "computer paint system" at the Palo Alto Research Center of the Xerox Corporation in the mid-1970s.

Aside from this technique, the display geometry of pixels is always as rasters of small uniform dots and geometry for individual pixels is neither varied over the frame nor stored in association with individual or groups of pixels.

With the present invention, the geometry of pixels includes vertical runs as well as horizontal and larger structures which exceed one pixel in both width and height (as well as less cohesive groupings). This will provide good data compression with more generalized types of images.

Again, referring to FIG. 8, with single-unit pixels, either of the images shown requires storage for 64 locations, say 24 bits each, for a total of 1,536 bits. With the present techniques however, storage is reduced to 36 pixels of 26 bits each, or a total of 936 bits—a reduction of about 40%.

Referring to the top-right diagram, it is clear that when storing this information in raster order, starting in the upper-left corner and then working across each line left-to-right, top-to-bottom: a 10 pixel is first encountered and stored and then the next unit may be skipped; then an 00 pixel is stored; then an 01 pixel is stored; then second 10 pixel is encountered and stored and then the next unit may be skipped; then a second 00 pixel is stored; then a second 01 pixel is stored; then, in row two, a third 00 pixel is stored; then a first 11 pixel is encountered and, not only can the next unit be skipped, but the two lower units may be skipped when encountered on row three; then the next unit can also be skipped because it is part of the 01 pixel at column 4, row 1; and so on.

The reverse process may be applied to filling a standard frame store from the data so stored. Briefly, the first pixel encountered, in the upper-left corner, is of type 10 and its value is used to fill the first two unit pixels in a standard store. The process continues in a like manner and, for clarity, it is just pointed out that when the first 11 pixel is encountered, its value is repeated in four units, over two rows, (2, 2), (2, 3), (3, 2) and (3, 3) where each pair of numbers refers to a (row, column) combination with the upper-left origin at (1, 1).

The software algorithm outlined above may be implemented in a straightforward manner into a standard frame store where each memory location corresponds to one pixel and, thus, such algorithms may be re-implemented in special purpose hardware.

One such implementation would provide a frame store storing both pixel color and geometry as described above and, in addition that "frame store data may be transferred to a smaller amount of very high-speed memory", also as described above, in the following manner.

Suppose that the largest variable-geometry meta-pixel to be displayed were the 11-type pixel of FIG. 8, a 2×2 unit feature. Then, a small amount of high-speed memory arranged as a three-line high recirculating window will suffice. Call the three lines A, B and C.

Just before display for the top of the image starts, data from the first row's data stored in the variable-geometry frame buffer is accessed and single unit pixels in lines A (for all four pixel types) and B (for type 01 and 11) are filled in. Since no feature is more than two unit pixels high, line C is still empty.

Then, display to the monitor is affected from line A (which is now complete) while further data is accessed from the variable geometry frame store. This data is used to fill in the still empty unit pixels of the B line with some "spill-over" into the C line.

Then display to the monitor is affected from line B (which is now complete) while further data is accessed from the variable geometry frame store. This data is used to fill in the still empty unit pixels of the C line with some "spill-over" into the A line; thus, no D line is needed. This recirculating arrangement is possible because, since the data from the A line has already been displayed, that data can be discarded and the memory re-assigned to a new display line below C. See FIGS. 10 and 11.

In general, it the largest meta-pixel feature is P pixels high, a window of P+1 lines of recirculating high-speed display memory are needed.

This procedure (that is, keeping compressed information in a variable-geometry frame buffer and expanding it a few lines at a time into a recirculating window) is more complex than keeping an image in a standard one-display-point-per-data-pixel frame buffer, and displaying in a more straight forward manner.

However, for many of the embodiments disclosed with the parent variable STS method, many frames of high- and low-definition information will have to be kept in a "smart" receiver. These can include: several received frames; frames of reconstructed data; frames of intermediate data; frames of interpolated data; or, frames of accumulated data. Also, images representing area maps of: where various algorithms are to be applied; motion areas; where various versions of image are to be used or mixed; etc. can also be transmitted or derived at the receiver.

The requirements to store many frames will tax the speed, capacity and cost factors of the memory available for such a smart receiver. Therefore, being able to send, store and process these images in compressed, variable-geometry format, and then to only expand them in small windows for display, will be of great advantage.

These same techniques and devices may also be used for other purposes with similar benefits. In general, these techniques permit fixed amounts of resolution to be redistributed as needed so that any system with a limited amount of storage, storing digital images, can then display such images or commit them to hard copy, such as film, with an apparently higher resolution than would be possible using standard one-display-point-per-data-pixel frame store techniques and designs.

The flows depicted in the software flow diagrams herein are exemplary, some items may be ordered differently, combined in a single step, skipped entirely, or accomplished in a different manner. However, the depicted flows will work. In particular, some of these functions may be carried out by hardware components, or by software routines residing on, or supplied with, such a component.

Similarly the systems depicted in the system diagrams herein are exemplary, some items may be organized differently, combined in a single element, omitted entirely, or accomplished in a different manner. However, the depicted systems will work. In particular, some of these functions may be carried out by hardware components, or by software routines residing on, or supplied with, such a component.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

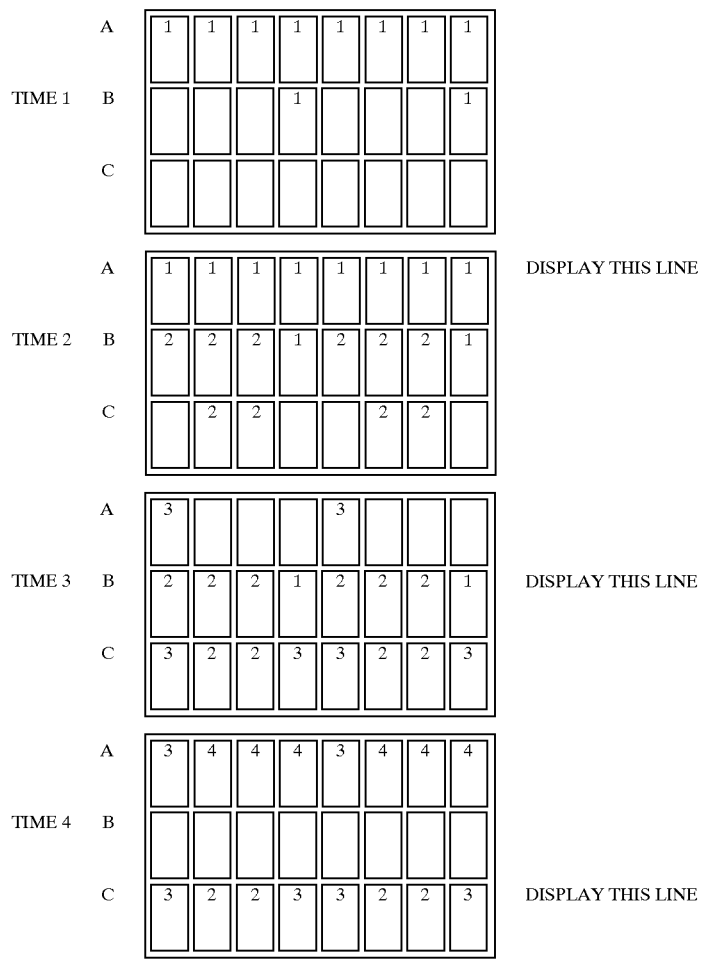

FIG. 54: Recirculating Window Frame Store
Memory Use

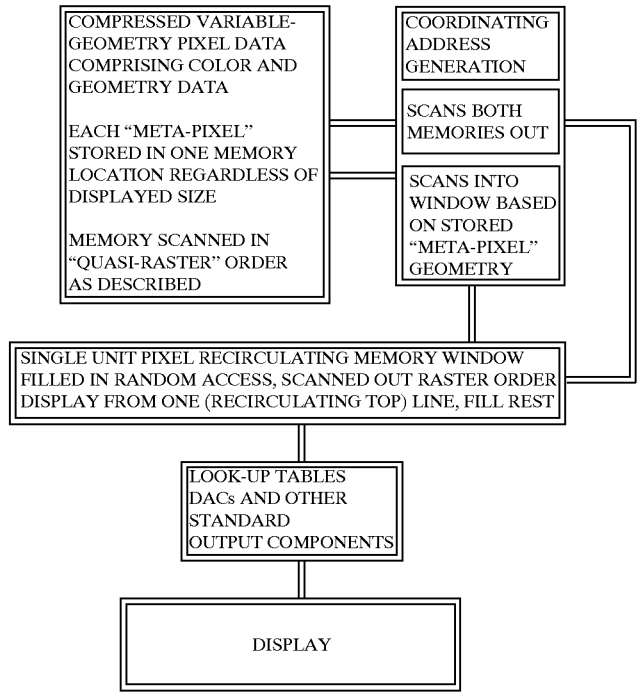

FIG. 55: High-Level System Diagram Recirculating Window Frame Store Memory

I claim:

1. An improved process for arranging information for the display of information points wherein said improvement comprises a reduction in the perception of visual anomalies accomplished by the modulation over time of at least some geometric parameter of at least some of said information points by the steps of:

a. generating a multiplicity of sets of content information points;

b. designating geometric information;

c. designating an association between said geometric information and one of said multiplicity of said sets of information points;

d. varying at least one of said designations, from set to set of said multiplicity of sets of content information points; and, e. conveying, in combination, said content information points and said geometric information.

2. A product produced by the process of transferring to an information bearing medium image information created by the process of claim 1.

3. An improved process for displaying information arranged by the process of claim 1, consisting of the steps of:

a. inputting input information comprising, in combination, said content information points and said geometric information;

b. extracting from said input information said content information points;

c. extracting from said input information said geometric information; and, d. displaying said content information points as display points, and modulating over time at least some geometric parameter of at least some of said display points in accordance with said geometric information.

4. A process as in claim 1, wherein said multiplicity of sets of content information points correspond to a multiplicity of frames of a motion picture sequence.

5. A process as in claim 3, wherein said multiplicity of sets of content information points correspond to a multiplicity of frames of a motion picture sequence.

6. A process as in claim 1, wherein the number of content information points is the same for each of said multiplicity of sets of content information points.

7. A process as in claim 3, wherein the number of content information points is the same for each of said multiplicity of sets of content information points.

8. A process as in claim 1, wherein the number of points to be displayed is the same as the number of content information points in the corresponding set of content information points, for each of said multiplicity of sets of content information points.

9. A process as in claim 3, wherein the number of points displayed is the same as the number of content information points in the corresponding set of content information points, for each of said multiplicity of sets of content information points.

10. A process as in claim 1, wherein the geometry of points to be displayed comprises at least the set of geometries of M×N rectangles where both M and N separately and/or in combination are greater than one for at least some of said points to be displayed.

11. A process as in claim 3, wherein the geometry of points displayed comprises at least the set of geometries of M×N rectangles where both M and N separately and/or in combination are greater than one for at least some of said points displayed.

12. A process as in claim 1, wherein said geometric information relates to the position of points to be displayed.

13. A process as in claim 3, wherein said geometric information relates to the position of points displayed.

14. A process as in claim 1, wherein said geometric information relates to the size of points to be displayed.

15. A process as in claim 3, wherein said geometric information relates to the size of points displayed.

16. A process as in claim 1, wherein said geometric information relates to the shape of points to be displayed.

17. A process as in claim 3, wherein said geometric information relates to the shape of points displayed.

18. A process as in claim 1, wherein separate geometric information is specified for each of said content information points.

19. A process as in claim 3, wherein separate geometric information is specified for each of said content information points.

20. A process as in claim 1, wherein an index into a set of geometric information patterns is combined with said content information points in lieu of said geometric information.

21. A process as in claim 3, wherein an index into a set of geometric information patterns is combined with said content information points in lieu of said geometric information, and said index is utilized in conjunction with step c. to reconstruct an appropriate member of that set for utilization in step d.

22. A process as in claim 1, wherein said geometric information is computed in a manner that is independent of said content information.

23. A process as in claim 3, wherein said geometric information is computed in a manner that is independent of said content information.

24. A process as in claim 1, wherein said geometric information specifies only geometries of "2×1" and "1×2".

25. A process as in claim 3, wherein said geometric information specifies only geometries of "2×1" and "1×2".

26. A process as in claim 1, wherein said geometric information specifies geometries of "1×1", "1×2", "2×1" and "2×2".

27. A process as in claim 3, wherein said geometric information specifies geometries of "1×1", "1×2", "2×1" and "2×2".

28. An improved system for displaying information as display points, which information comprises in combination both content information points and geometric information, wherein said improvement comprises a reduction in the perception of visual anomalies accomplished by the modulation over time of at least some geometric parameter of at least some of said display points, consisting of:
   a. a system component for inputting input information comprising, in combination, content information points and geometric information;
   b. a system component for extracting from said input information said content information points;
   c. a system component for extracting from said input information said geometric information; and,
   d. a system component for displaying said content information points as said display points, connected to the output of both of said extracting system components, capable of modulating over time at least some geometric parameter of at least some of said display points in accordance with said geometric information.

29. A system as in claim 28, wherein said modulation is controlled at least in part by geometric information stored in association with said information content points.

30. A system as in claim 28, wherein said display points are individually modulatable.

31. A system as in claim 28, wherein said modulation to the geometric parameters may be selected from a set of more than two possible alternatives.

32. A system as in claim 28, wherein said geometric modulation relates to display point position.

33. A system as in claim 28, wherein said geometric modulation relates to display point size.

34. A system as in claim 28, wherein said geometric modulation relates to display point shape.

35. A system as in claim 34, wherein said display point shape includes at least some shapes that are more than a single pixel high.

36. A system as in claim 34, wherein said display point shape includes at least some shapes that are more than a single pixel wide and more than a single pixel high.

37. An improved frame store device comprising means to store data points and means to display picture elements specified by said data points; wherein the improvement comprises storage and display means where, for at least some picture elements, data is stored in said storage means to specify both display content and picture element geometry, and for at least some picture elements a particular data point associated with a particular data element contains in combination information to specify picture element content and picture element geometry, and said picture element geometry comprises at least the set of geometries of M×N rectangles where both M and N separately and/or in combination are greater than one for at least some members of said set of geometries, and said display means is capable of displaying points whose contents and geometry is specified by said stored data.

38. A product produced by the process of transferring to an information bearing medium image information represented by data stored in the device of claim 37.

39. An improved frame store device comprising means to store data points and means to display picture elements specified by said data points; wherein the improvement comprises the incorporation of: a first memory storage means of a first access speed; a second memory storage means of a second faster access speed; and means to transfer a portion of data between said first memory storage means and said second memory storage means to permit processing to be affected at a faster speed in said second memory storage means, wherein said processing comprises more than merely transferring information from one memory storage means to another.

40. A product produced by the process of transferring to an information bearing medium image information represented by data stored in the device of claim 39.

* * * * *